(12) United States Patent
Yeh et al.

(10) Patent No.: US 10,961,130 B2
(45) Date of Patent: Mar. 30, 2021

(54) SYSTEMS AND METHODS FOR NUTRIENT RECOVERY AND USE

(71) Applicant: UNIVERSITY OF SOUTH FLORIDA, Tampa, FL (US)

(72) Inventors: Daniel H. Yeh, Tampa, FL (US); Jorge Luis Calabria, Land O Lakes, FL (US); Onur Y. Ozcan, Tampa, FL (US); Robert A. Bair, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 82 days.

(21) Appl. No.: 16/319,728

(22) PCT Filed: Jul. 21, 2017

(86) PCT No.: PCT/US2017/043327
§ 371 (c)(1),
(2) Date: Jan. 22, 2019

(87) PCT Pub. No.: WO2018/017975
PCT Pub. Date: Jan. 25, 2018

(65) Prior Publication Data
US 2019/0276334 A1 Sep. 12, 2019

Related U.S. Application Data

(60) Provisional application No. 62/365,729, filed on Jul. 22, 2016.

(51) Int. Cl.
*C02F 1/28* (2006.01)
*C05B 17/00* (2006.01)
(Continued)

(52) U.S. Cl.
CPC ............. *C02F 1/283* (2013.01); *C02F 1/281* (2013.01); *C05B 17/00* (2013.01); *C05C 11/00* (2013.01);
(Continued)

(58) Field of Classification Search
CPC ........................................................ E03F 5/14
(Continued)

(56) References Cited

U.S. PATENT DOCUMENTS 4,750,512 A * 6/1988 Craig .................... A01C 23/042
137/268
4,957,134 A * 9/1990 Craig .................... A01C 23/042
137/268

(Continued)

FOREIGN PATENT DOCUMENTS

WO W2016025109 A1 2/2016

OTHER PUBLICATIONS

Al-Hafedh, Yousef S., et al., "Food Production and Water Conservation in a Recirculating Aquaponic System in Saudi Arabia at Different Ratios of Fish Feed to Plants", Journal of the World Aquaculture Society, 2008, pp. 510-520, vol. 39, No. 4.
(Continued)

*Primary Examiner* — Nina Bhat
(74) *Attorney, Agent, or Firm* — Thomas Horstemeyer, LLP

(57) ABSTRACT

A system includes at least one reusable nutrient cartridge including an outer housing having an inlet and an outlet, and nutrient-adsorbing material contained within the housing, the material being configured to adsorb nutrients, wherein the cartridge is configured to be charged with nutrients by flowing a nutrient stream through the inlet, through the nutrient-adsorbing material, and through the outlet to enable the nutrient-adsorbing material to adsorb the nutrients,
(Continued)

wherein the cartridge is also configured to be later discharged of the nutrients by flowing water through the inlet, through the nutrient-adsorbing material, and through the outlet so as to transfer the nutrients to the water to generate a dilute nutrient solution suitable for use as a fertilizer.

21 Claims, 3 Drawing Sheets

(51) Int. Cl.
| | | |
|---|---|---|
| C05C 11/00 | (2006.01) | |
| C05D 1/00 | (2006.01) | |
| C02F 101/10 | (2006.01) | |
| C02F 101/16 | (2006.01) | |
| C02F 101/30 | (2006.01) | |
| E03F 5/14 | (2006.01) | |

(52) U.S. Cl.
CPC ............ *C05D 1/00* (2013.01); *C02F 2101/10* (2013.01); *C02F 2101/105* (2013.01); *C02F 2101/16* (2013.01); *C02F 2101/30* (2013.01); *C02F 2201/006* (2013.01); *C02F 2303/16* (2013.01); *E03F 5/14* (2013.01)

(58) Field of Classification Search
USPC ......... 210/670; 137/268; 422/255, 276, 270, 422/261
See application file for complete search history.

(56) References Cited

U.S. PATENT DOCUMENTS

| | | | | |
|---|---|---|---|---|
| 5,178,181 | A * | 1/1993 | Craig | B01F 1/0027 137/268 |
| 5,656,159 | A * | 8/1997 | Spencer | C02F 1/50 210/206 |
| 5,660,802 | A * | 8/1997 | Archer | C02F 1/505 137/268 |
| 5,820,762 | A * | 10/1998 | Bamer | B01D 17/0202 210/661 |
| 6,524,540 | B1 * | 2/2003 | Heinig, Jr. | B01J 23/50 422/211 |
| 7,186,333 | B2 * | 3/2007 | Kluge | E03F 1/00 210/164 |
| 7,588,744 | B1 | 9/2009 | Sylvester | |
| 8,759,251 | B2 * | 6/2014 | Long | B01J 20/22 502/401 |
| 9,051,192 | B2 * | 6/2015 | Kent | C02F 1/004 |
| 9,462,745 | B1 * | 10/2016 | Jivanjee, Jr. | A01C 23/042 |
| 10,322,956 | B2 * | 6/2019 | Whiteman | C08L 33/14 |
| 10,549,245 | B2 * | 2/2020 | Freudenberg | B01F 15/0203 |
| 2008/0073277 | A1 * | 3/2008 | Paoluccio | E03F 1/00 210/691 |
| 2010/0193416 | A1 | 8/2010 | Barbaro | |
| 2011/0309024 | A1 | 12/2011 | Athanasiadis | |
| 2012/0091070 | A1 | 4/2012 | Sjauta | |
| 2013/0233802 | A1 | 9/2013 | Viswanathan | |
| 2013/0299429 | A1 | 11/2013 | Connaughton | |
| 2014/0027362 | A1 | 1/2014 | Kent | |
| 2016/0016127 | A1 * | 1/2016 | Mentzel | B01D 69/10 415/121.3 |
| 2018/0105437 | A1 * | 4/2018 | Beierwaltes | C02F 1/283 |

OTHER PUBLICATIONS

Allen, Ben, et al., "International review of Bio-economy Strategies with a focus on waste resources", Report prepared for the UK Government Department for Business, Innovation and Skills, 2015, pp. 1-64, Institute for European Environmental Policy, London.

Allgeier, S., et al., "Membrane Filtration Guidance Manual: Overview and Summary", United States Environmental Protection Agency, 2005, pp. 1-12, United States, http://www.epa.gov/safewater/lt2/guides.html.

Arnon, D.I. and P.R. Stout, "The Essentiality of Certain Elements in Minute Quantity for Plants With Special Reference to Copper", Plant Physiology, 1939, pp. 371-375.

Batstone, D.J., et al., "Platforms for energy and nutrient recovery from domestic wastewater: A review", Chemosphere, 2014, pp. 1-10, doi: 10.1016/j.chemosphere.2014.10.02.

Bernardi, Alberto C. de Campos, et al., "Nitrogen, Potassium, and Nitrate Concentrations of Lettuce Grown in a Substrate with KNO3-Enriched Zeolite", Communications in Soil Science and Plant Analysis, 2015, pp. 819-826, vol. 46, No. 7, doi: 10.1080/00103624.2014.981273.

Booker, N.A., et al., "Ammonia Removal From Sewage Using Natural Australian Zeolite", Water Science & Technology, 1996, pp. 17-24, vol. 34, No. 9, Elsevier Science Ltd., Great Britian.

Borgognone, Daniela, et al., "Effect of nitrogen form and nutrient solution pH on growth and mineral composition of self-grafted and grafted tomatoes", Scientia Horticulturae, 2013, pp. 61-69, vol. 149, Elsevier B.V., doi: 10.1016/j.scienta.2012.02.012.

Britto, Dev T. and Herbert J. Kronzucker, "NH4+ toxicity in higher plants: a critical review", Journal of Plant Physiology, 2002, pp. 567-584, vol. 159, http://www.urbanfischer.de/journals/jpp.

Butler, Rhett and Tony Maccormick, "Opportunities for decentralized treatment, sewer mining and effluent re-use", Desalination, 1996, pp. 273-283, vol. 106.

Churkina, Galina, "The Role of Urbanization in the Global Carbon Cycle", Frontiers in Ecology and Evolution, 2016, pp. 1-9, vol. 3, No. 144, doi: 10.3389/fevo.2015.00144.

Cofie, O. O., et al., "Resource recovery from urban waste: Options and challenges for community-based composting in sub-Saharan Africa", Desalination, 2009, pp. 256-261, vol. 248, Elsevier B.V., doi: 10.1016/j.desal.2008.05.063.

Cordell, Dana, "The Story of Phosphorus: Sustainability implications of global phosphorus scarcity for food security", pp. i-xix.

Cordell, D., et al., "Towards global phosphorus security: A systems framework for phosphorus recovery and reuse options", Chemosphere, 2011, pp. 747-758, vol. 84, doi: 10.1016/j.chemosphere.2011.02.032.

Davidson, Eric A., et al., "More Food, Low Pollution (Mo Fo Lo Po): A Grand Challenge for the 21st Century", Journal of Environmental Quality, 2015, pp. 305-311, vol. 44, doi: 10.2134/jeq2015.02.0078.

Devalerio, Jim, et al., "Fertigation for Vegetables: A Practical Guide for Small Fields1", University of Florida, IFAS Extension, 2012, pp. 1-7, vol. HS1206.

Digiano, Francis A., et al., Safe Water for Everyone, Water Environment & Technology, 2004, pp. 30-35, vol. 16, No. 6, Water Environment Federation, https://www.jstor.org/stable/43888794.

Doughty, Mark R.C. and Geoffry P. Hammond, "Sustainabilityand the built environment at and beyond the city scale", Building and Environment, 2004, pp. 1223-1233, vol. 39, doi: 10.1016/j.buildenv.2004.03.008.

Drangert, Jan-Olof, "Urine blindness and the use of nutrients from human excreta in urban agriculture", GeoJournal, 1998, pp. 201-208, vol. 45, Kluwer Academic Publishers, Netherlands.

Drews, A. and M. Kraume, "Process Improvement by Application of Membrane Bioreactors", Chemical Engineering Research and Design, 2005, pp. 276-284, vol. 83, No. A3, doi: 10.1205/cherd.04259.

Erisman, J. W., et al., "How a century of ammonia synthesis changed the world", Nature Geoscience, 2008, pp. 636-639, vol. 1, Macmillan Publishers Limited, www.nature.com/naturegeoscience.

Ernst, Jeremy V. and Joe R. Busby, "Hydroponics: Content and Rationale", The Technology Teacher, 2009, pp. 20-24, vol. 68, No. 6.

FAO, IFAD and WFP, "The State of Food Insecurity in the World: The multiple dimensions of food security", 2013, FAO, Rome, E-ISBN 978-92-5-107917-1.

(56) References Cited

OTHER PUBLICATIONS

Fowler, D., et al., "Effects of global change during the 21st century on the nitrogen cycle", Atmospheric Chemistry and Physics, 2015, pp. 13849-13893, vol. 15, Copernicus Publications on behalf of the European Geosciences Union, doi: 10.5194/acp-15-13849-2015.

Fox, Rachel and David Stuckey, "MS-2 and T4 phage removal in an anaerobic membrane bioreactor (AnMBR): effect of gas sparging rate", Journal of Chemical Technology & Biotechnology, 2014, pp. 384-390, vol. 90, doi:10.1002/jctb.4586.

Galloway, James N., et al., "The Nitrogren Cascade", BioScience, 2003, pp. 341-356, vol. 53, No. 4.

Gao, N.F., et al., "Zeolite-carbon composites prepared from industrial wastes: (II) evaluation of the adaptability as environmental materials", Materials Science and Engineering A, 2005, pp. 274-280, vol. 404, doi: 10.1016/j.msea.2005.05.090.

Ghehsareh, Ahmad Mohammadi, et al., "The effect of different nutrient solutions on some growth indices of greenhouse cucumber in soilless culture", Journal of Plant Breeding and Crop Science, 2011, pp. 321-326, vol. 3, No. 12, doi: 10.5897/JPBCS11.061.

Gikas, Petros and Georga Tchobanoglous, "The role of satellite and decentralized strategies in water resources management", Journal of Environmental Management, 2009, pp. 144-152, vol. 90, doi: 10.1016/j.jenvman.2007.08.016.

Guest, Jeremy S., et al., "A New Planning and Design Paradigm to Achieve Sustainable Resource Recovery from Wastewater1", Environmental Science & Technology Feature, 2009, pp. 6126-6130, vol. 43, doi: 10.1021/es9010515.

Gupta, Rahul and Sumita Gupta Gangopadhyay, "Urban Food Security through Urban Agriculture and Waste Recycling: Some Lessons for India", Vikalpa, 2013, vol. 38, No. 3.

Gupta, V.K., et al., "Removal of ammonium ions from wastewater a short review in development of efficient methods", Global Journal Environmental and Science Management, 2015, pp. 149-158, vol. 1, No. 2, doi: 10.7508/gjesm.2015.02.007.

Gustavsson, Jenny, et al., "Global Food Lossesand Food Waste", Save Food Congress, Düsseldorf, Germany, 2011, pp. 1-24, SP Group.

Halim, Azhar Abdul, et al., "Comparison study of ammonia and COD adsorption on zeolite, activated carbon and composite materials in landfill leachate treatment", Desalination, 2010, pp. 31-35, vol. 262, doi: 10.1016/j.desal.2010.05.036.

Halim, Azhar Abdul, et al., "Semi-Aerobic Landfill Leachate Treatment Using Carbon—Minerals Composite Adsorbent", Environmental Engineering Science, 2012, pp. 306-312, vol. 29, No. 5, doi: 10.1089/ees.2010.0204.

Hedstrom, Annelie, "Ion Exchange of Ammonium in Zeolites: A Literature Review", Journal of Environmental Engineering, 2001, pp. 673-681, vol. 127, No. 8.

Hoagland, D. R. and D. I. Arnon, "The water-culture method for growing plants without soil", Circular, 1938, pp. 1-39, vol. 347.

Hochmuth, George and Ed Hanlon, "A Summary of N, P, and K Research with Tomato in Florida1", University of Florida IFAS Extension, 2000, pp. 1-34, vol. SL355.

Hochmuth, Robert C. and Dilcia E. Toro, "Characterization of the Florida Fresh Fruit and Vegetable Industry Using Hydroponic Systems or Protected Agriculture Structures1", University of Florida IFAS Extension, 2014, pp. 1-8, vol. HS1240.

Holden, Richard, "Urban Sanitation Technologies: The Challenges of Reaching the Urban Poor", IRC Symposium: Sanitation for the Urban Poor Partnerships and Governance, Delft, The Netherlands, 2008, pp. 1-14.

Jensen, Merle H. and W. L. Collins, "Hydroponic Vegetable Production", Horticultural Reviews, 1985, pp. 483-558 vol. 7, John Wiley & Sons Inc.

Johnston, A. Edward, et al., "Phosphorus: Its Efficient Use in Agriculture", Advances in Agronomy, 2014, pp. 178-228, vol. 123, doi: 10.1016/B978-0-12-420225-2.00005-4.

Jonsson, Hakan, et al., "Composition of urine, faeces, greywater and biowaste for utilisation in the URWARE model", Urban Water, 2005, vol. 6, Gothenburg Sweden, pp. 5-44.

Jung, Jin-Young, et al., "Enhanced ammonia nitrogen removal using consistent biological regeneration and ammonium exchange ofzeolite in modified SBR process", Water Research, 2004, pp. 347-354, vol. 38, doi: 10.1016/j.watres.2003.09.025.

Kim, Jeonghwan, et al., "Anaerobic Fluidized Bed Membrane Bioreactor for Wastewater Treatment", Environmental Science & Technology, 2011, pp. 576-581, vol. 45, No. 2, doi: 10.1021/es1027103.

Kimball, B. A., "Carbon Dioxide and Agricultural Yield: An Assemblage and Analysis of 430 Prior Observations1", Agronomy Journal, 1983, pp. 779-788, vol. 75.

Kimochi, Y., et al., "Tertiary treatment of domestic wastewater using zeolite ceramics and aquatic plants", Water Science & Technology, 2008, pp. 847-851, vol. 58, No. 4.

Kocaturk, Nazli Pelin and Bilsen Beler Baykal, "Recovery of Plant Nutrients from Dilute Solutions of Human Urine and Preliminary Investigations on Pot Trials", Clean—Soil, Air, Water, 2012, pp. 538-544, vol. 40, No. 5, doi: 10.1002/clen.201100193.

Kraemer, Jeremy T., et al., "A practitioner's perspective on the application and research needs of membrane bioreactors for municipal wastewater treatment", Bioresource Technology, 2012, pp. 2-10, vol. 122, doi: 10.1016/j.biortech.2012.05.014.

Lahav, Ori and Michal Green, "Ammonium Removal Using Ion Exchange and Biological Regeneration", Water Research, 1998, pp. 2019-2028, vol. 32, No. 7, Great Britain.

International Search Report for PCT/US2017/043327 dated Nov. 22, 2019.

Lancellotti, I., et al., "Release of agronomical nutrient from zeolitite substrate containing phosphatic waste", Environmental Science and Pollution Research, 2014, pp. 13237-13242, vol. 21.

Li, A, et al., "Application of Membrane Anaerobic Reactor System for the treatment of Industrial Wastewaters", 39th Industrial Waster Conference, Ann Arbor, 1985, pp. 627-636.

Li, Qiang, et al., "Short-cut nitrification inbiological aerated filterswith modifiedzeolite and nitrifying sludge", Bioresource Technology, 2013, pp. 148-154, vol. 136, doi: 10.1016/j.biortech.2013.02.081.

Liao, Bao-Qiang, et al., "Anaerobic Membrane Bioreactors: Applications and Research Directions", Critical Reviews in Environmental Science and Technology, 2006, pp. 489-530, vol. 36, No. 6, doi: 10.1080/10643380600678146.

Lin, Yanzi, et al., "Economic and environmental evaluation of nitrogen removal and recovery methods from wastewater", Bioresource Technology, 2016, pp. 227-238, vol. 215, doi: 10.1016/j.biortech.2016.03.064.

McCarty, Perry L., et al., "Domestic Wastewater Treatment as a Net Energy Producer-Can This be Achieved?", Environmental Science & Technology, 2011, pp. 7100-7106, vol. 45, ACS Publications, doi: 10.1021/es2014264.

Miladinovic, N. and L.R. Weatherley, "Intensification of ammonia removal in a combined ion-exchange and nitrification column", Chemical Engineering Journal, 2008, pp. 15-24, vol. 135, doi: 10.1016/j.cej.2007.02.030.

Miles, Carol, et al., "Fertigation in Organic Vegetable Production Systems", eXtension, 2015, https://articles.extension.org/pages/29712/fertigation-in-organic-vegetable-production-systems (accessed Aug. 23, 2019).

Ming, D.W., et al., "Plant Growth Experiments in Zeoponic Substrates: Applications for Advanced Life Support Systems", Biosmass Productions, 2001, pp. 1-2.

Mojiri, Amin, et al., "Co-treatment of landfill leachate and municipal wastewater using the ZELIAC/zeolite constructed wetland system", Journal of Environmental Management, 2016, pp. 124-130, vol. 166, doi: 10.1016/j.jenvman.2015.10.020.

Mortensen, Leiv M., "Review: CO 2 Enrichment in Greenhouses. Crop Responses", Scientia Horticulturae, 1987, pp. 1-25, vol. 33, Elsevier Science Publishers B.V., Amsterdam, The Netherlands.

"The Millenium Developmental Goals Report", United Nations, 2013, pp. 1-60, United Nations, New York, ISBN 978-92-1-101284-2.

Van Nooten, Thomas, et al., "Microbially Mediated Clinoptilolite Regeneration in a Multifunctional Permeable Reactive Barrier Used to Remove Ammonium from Landfill Leachate Contamination:

(56) References Cited

OTHER PUBLICATIONS

Laboratory Column Evaluation", Environmental Science & Technology, 2010, pp. 3486-3492, vol. 44, No. 9, doi: 10.1021/es9038616.

Norton-Brandao, Diana, et al., "Reclamation of used urban waters for irrigation purposes—A review of treatment technologies", Journal of Environmental Management, 2013, pp. 85-98, vol. 122, doi: 10.1016/j.jenvman.2013.03.012.

Orsini, Francesco, et al., "Urban agriculture in the developing world: a review", Agronomy for Sustainable Development, 2013, pp. 1-26, doi: 10.1007/s13593-013-0143-z.

Oyama, N., et al., "Recycling of treated domestic effluent from an on-site wastewater treatment system for hydroponics", Water Science & Technology, 2005, pp. 211-219, vol. 51, No. 10.

Ozores-Hampton, Monica, et al., "Blossom Drop, Reduced Fruit Set, and Post-Pollination Disorders in Tomato1", University of Florida IFAS Extension, 2012, pp. 1-6, vol. HS1195.

Parham, Walter E., "Future Perspectives for Natural Zeolites in Agriculture and Aquaculture", Zeo-Agriculture: Use of Natural Zeolites in Agriculture and Aquaculture, ed. Pond and Mumpton, 1983, pp. 283-285, Westview Press, Boulder Colorado.

Pellegrin, Marie-Laure, et al., "Membrane Processes", Water Environment Research, 2013, pp. 1187-1284, vol. 83, No. 10doi: 10.2175/106143011X13075599869290.

Puchongkawarin, C., et al., "Optimization-based methodology for the development of wastewater facilities for energy and nutrient recovery", Chemosphere, 2015, pp. 150-158, vol. 140, doi: 10.1016/j.chemosphere.2014.08.061.

Qadir, M., et al., "The challenges of wastewater irrigation in developing countries", Agricultural Water Management, 2010, pp. 561-568, vol. 97, doi: 10.1016/j.agwat.2008.11.004.

Redclift, Michael, "Sustainable Development (1987-2005): An Oxymoron Comes of Age", Sustainable Development, 2005, pp. 212-217, vol. 13, Wiley InterScience, doi: 10.1002/sd.281.

Roncal-Herrero, T. and E.H. Oelkers, "Experimental determination of struvite dissolution and precipitation rates as a function of pH", Applied Geochemistry, 2011, pp. 921-928, vol. 26, doi: 10.1016/j.apgeochem.2011.03.002.

Rosso, Diego and Michael K. Stenstrom, "The carbon-sequestration potential of municipal wastewater treatment", Chemosphere, 2008, pp. 1468-1475, vol. 70, doi: 10.1016/j.chemosphere.2007.08.057.

Smith, Daniel P. and Nathaniel T. Smith, "Local-scale recovery of wastewater nitrogen for edible plant growth", Water Science & Technology, 2016, pp. 1287-1292, vol. 73, No. 6.

Smith, Adam L., et al., "Perspectives on anaerobic membrane bioreactor treatment of domestic wastewater: A critical review", Bioresource Technology, 2012, pp. 149-159, vol. 122, Elsevier Ltd., doi: 10.1016/j.biortech.2012.04.055.

Stefanelli, Dario, et al., "Minimal nitrogen and water use in horticulture: Effects on quality and content of selected nutrients", Food Research International, 2010, pp. 1833, 1843, vol. 43, Elsevier Ltd., doi: 10.1016/j.foodres.2010.04.022.

Strohwald, N. K H. and W. R. Ross, "Application of the ADUFR Process to Brewery Effluent on a Laboratory Scale", Water Sceince & Technology, 1992, pp. 95-105, vol. 25, No. 10, Great Britain.

Tanner, Chris C., "Plants for constructed wetland treatment systems—A comparison of the growth and nutrient uptake of eight emergent species", Ecological Engineering, 1996, pp. 59-83, vol. 7.

Thomaier, Susanne, et al., "Farming in and on urban buildings: Present practice and specific novelties of Zero-Acreage Farming (ZFarming)", Renewable Agriculture and Food Systems, 2014, pp. 43-54, vol. 30, No. 1, doi: 10.1017/S1742170514000143.

Trompette, Paul-Antoine, "Urban agriculture: a social development tool. Improving access to affordable, healthy food in a low-income area of Toronto, Canada", Master's Thesis at Norwegian University of Life Sciences, 2013, pp. 1-61.

UNESCO and SCOPE, "Human alteration of the nitrogen cycle: Threats, benefits and opportunities", UNESCO-SCOPE Policy Briefs, 2007, pp. 1-6, No. 4.

Van Lier, Jules B. and Gatze Lettinga, "Appropriate Technologies for Effective Management of Industrial and Domestic Waste Waters: The Decentralised Approach", Water Science & Technology, 1999, pp. 171-183, vol. 40, No. 7, Elsevier Science Ltd., Great Britain.

Vasilakopoulou, et al., "Urban Heat Island Mitigation Techniques for Sustainable Cities in S.T. Rassia & P.M. Pardalos (Eds)", Cities for smart environmental and energy futures: impacts on architecture and technology, 2014, pp. 215-231.

Visvanathan, Chettiyappan and Amila Abeynayaka, "Developments and future potentials of anaerobic membrane bioreactors (AnMBRs)", Membrane Water Treatment, 2012, pp. 1-23, vol. 3, No. 1.

Wang, Shaobin and Yuelian Peng, "Natural zeolites as effective adsorbents in water and wastewater treatment", Chemical Engineering Journal, 2010, pp. 11-24, vol. 156, doi: 10.1016/j.cej.2009.10.029.

Wang, Zhiwei, et al., "Application of Anaerobic Membrane Bioreactor to the Treatment of Low-strength Municipal Wastewater", 2010, 4th International Conference on Bioinformatics and Biomedical Engineering.

Wijekoon, Kaushalya C., "Effect of organic loading rate on VFA production, organic matter removal and microbial activity of a two-stage thermophilic anaerobic membrane bioreactor", Bioresource Technology, 2011, pp. 5353-5360, vol. 102, doi: 10.1016/j.biortech.2010.12.081.

Wittwer, S. H. and WM. Robb, "Carbon Dioxide Enrichment of Greenhouse Atmospheres for Food Crop Production 1", Economic Botany, 1964, pp. 34-56, vol. 18, No. 1, doi:10.1007/BF02904000.

Xie, Ming, et al., "Membrane-based processes for wastewater nutrient recovery: Technology, challenges, and future direction", Water Research, 2016, pp. 210-221, vol. 89, doi: 10.1016/j.watres.2015.11.045.

Xu, Suyun, et al., "Nitrogen and Phosphate Recovery from Source-Separated Urine by Dosing with Magnesite and Zeolite", Polish Journal of Environmental Studies, 2015, pp. 2269-2275, vol. 24, No. 5, doi: 10.15244/pjoes/43611.

Yang, Wenbo, et al., "State-of-the-art of membrane bioreactors: Worldwide research and commercial applications in North America", Journal of Membrane Science, 2006, pp. 201-211, vol. 270, doi: 10.1016/j.memsci.2005.07.010.

Yermiyahu, Uri, et al., "Long term agronomic and environmental effects of irrigation with reclaimed wastewater", Geophysical Research Abstracts, EGU General Assembly 2014, vol. 16.

Zhang, Xinying, et al., "Formation of dynamic membrane in an anaerobic membrane bioreactor for municipal wastewater treatment", Chemical Engineering Journal, 2010, pp. 175-183, vol. 165, doi: 10.1016/j.cej.2010.09.013.

Miles, Carol, et al., "Fertigation in Organic Vegetable Production Systems," eOrganic, pp. 1-2, retrieved Nov. 11, 2019 (https://eorganic.org/node/4937).

Gray, Donald M.D., et al., "Anaerobic Digestion of Food Waste," U.S. Environmental Protection Agency Region 9, East Bay Municipal Utility District, 2008, pp. i-B2, Final Report.

Stoner, Nancy, et al., "Guidelines for Water Reuse," U.S. Environmental Protection Agency—Office of Wastewater Management; National Risk Management Research Laboratory; U.S. Agency for International Development, 2012, i-G2, EPA/600/R-12/618.

Orsini, Francesco, et al., "Urban agriculture in the developing world: a review," Agronomy for Sustainable Development, 2013, pp. 695-720, vol. 33, doi: 10.1007/s13593-013-0143-z.

Smith, Shaleena, "Pilot assessment of Novel Membrane Bioreactor Processes—Improvements in Biological Nutrient Removal and Membrane Operation," University of South Florida Scholar Commons—Graduate Theses and Dissertations, 2011, iii-92.

Tchobanoglous, George, "The Role of Decentralized Wastewater Management in the Twenty-First Century," WEFTEC, 2002, pp. 1-17, doi: 10.2175/193864702784248881.

International Search Report for PCT/US2017/043327 dated Dec. 10, 2017.

European Search Report dated Oct. 15, 2020 for European Patent Application No. 17831969.5.

(56) References Cited

OTHER PUBLICATIONS

Bansiwal, Amit Kumar, et al. "Surfactant-modified zeolite as a slow release fertilizer for phosphorus." Journal of Agricultural and Food Chemistry 54.13 (2006): 4773-4779.

\* cited by examiner

SYSTEMS AND METHODS FOR NUTRIENT RECOVERY AND USE

CROSS-REFERENCE TO RELATED APPLICATION

This application is the 35 U.S.C. § 371 national stage application of PCT Application No. PCT/US2017/43327, filed Jul. 21, 2017, where the PCT claims priority to U.S. Provisional Application Ser. No. 62/365,729, filed Jul. 22, 2016, both of which are herein incorporated by reference in their entireties.

NOTICE OF GOVERNMENT-SPONSORED RESEARCH

This invention was made with Government support under grant contract number RD835569 awarded by the National Science Foundation and 1243510 awarded by the National Science Foundation. The Government has certain rights in the invention.

BACKGROUND

Although wastewater is commonly viewed as a problematic "waste" stream, it often contains large amounts of compounds that could be put to beneficial use. For example, residential wastewater is an abundant source of nutrients, such as nitrogen, phosphorous, and potassium. These nutrients are major components of synthetic fertilizers typically used in agricultural and horticultural applications. If such nutrients could be economically harvested from wastewater and made available to end users at low cost, they could be of great benefit to those end users, particularly in arid regions where poor soil conditions exist.

Wastewater is typically treated before being released to the environment as untreated wastewater can cause environmental degradation. For example, wastewater is often treated in wastewater treatment (WWT) plants to remove its organic compounds and nutrients. The organic compounds are typically removed using biological processes, while the nutrients are removed through additional process operations. Nutrient removal processes impose additional costs. Additionally, nutrients that are removed through these operations become unavailable for use in agricultural or horticultural processes.

Existing methods for the recovery and reuse of nutrients from wastewater have inherent drawbacks. Precipitation-based approaches, such as the formation of magnesium ammonium phosphate (struvite) and calcium phosphate, often require elevated pH, high nutrient concentrations, addition of additional chemicals (e.g., magnesium oxide), subsequent dewatering and drying, and handling/packaging, which adds to the costs. Another approach is the direct use of partially-treated and disinfected wastewater for plant irrigation without prior removal of nutrients (direct fertigation). Such methods are appealing since the nutrients are preserved in the irrigation water and utilized efficiently. However, direct fertigation requires that the demand (i.e., end user) be physically located near the supply (wastewater source). This is something that is often not possible or practical.

In view of the above discussion, it can be appreciated that it would be desirable to have a low-cost system and method for recovering nutrients from nutrient sources, such as a wastewater, and making such nutrients available to end users in agricultural or horticultural processes.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have a low-cost system and method for recovering nutrients from nutrient sources, such as a wastewater, and making such nutrients available to end users in agricultural or horticultural processes. Disclosed herein are examples of such systems and methods. In one embodiment, a system comprises reusable nutrient cartridges that are configured to adsorb nutrients from a nutrient stream and then used at an agricultural or horticultural site as a fertilizer source. In some embodiments, the cartridges can be "charged" with nutrients at a nutrient source site by flowing a nutrient stream through the cartridge, delivered to an end use site, used to fertilize crops or other plants at the end use site by flowing water through the charged cartridge (thereby "discharging" the cartridge), and then returned to the nutrient source site for recharging. The cartridge can then be reused in this manner again and again until the end of its useful life. Although the system is scalable, in some embodiments, the cartridges are relatively small in size so as to facilitate easy delivery to the end use site, which may be remote from the nutrient source site.

In the following disclosure, various specific embodiments are described. It is to be understood that those embodiments are example implementations of the disclosed inventions and that alternative embodiments are possible. All such embodiments are intended to fall within the scope of this disclosure.

Disclosed herein are nutrient recovery systems employing compact, reusable nutrient cartridges capable of capturing nutrients from nutrient streams and subsequently releasing them in desired, targeted streams. The cartridges utilize ion exchange and adsorptive materials to selectively capture pertinent nutrient material from the nutrient streams, thereby providing a method for low-cost nutrient removal. The cartridges, once charged with nutrient material, subsequently release nutrients where desired serving as a passive, low-cost technology for nutrient removal and fertigation. The cartridges house ion exchange and adsorptive media in combination with filter material to achieve a flow-through design. In some embodiments, an indicator is used to indicate the level of nutrient charge (i.e., nutrient concentration) within the cartridge. Consequently, the disclosed systems enable passive nutrient recovery, effectively alleviating problems associated with the lack of access to pertinent nutrient resources necessary for remote agricultural operations in non-ideal locations.

Figure 1:
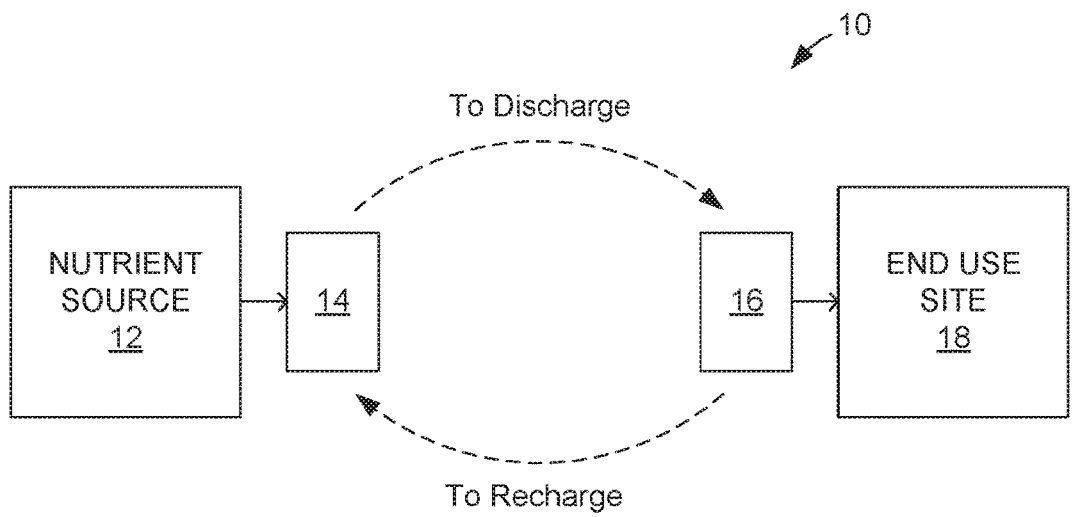
FIG. 1 is a block diagram of an embodiment of a system for nutrient recovery and use.

FIG. 1 provides an overview of an example nutrient recovery and use system 10. As indicated in the figure, the system 10 includes a nutrient source 12 that can produce an aqueous nutrient stream from which nutrients can be collected. The nutrient source 12 can comprise any source that generates a nutrient stream. For example, the nutrient source 12 can be a wastewater treatment facility. In other cases, the nutrient source 12 can be a septic system or sewer line of one or a number of homes. In still other cases, the nutrient source 12 can be one or a number of homes that collect urine separate from other human waste (e.g., using urinals). In further cases, the nutrient source 12 can be a source of food waste. Other examples of potential nutrient sources 12 are fish ponds and aquaculture tanks. Notably, the specific nature of the nutrient source 12 is not critical. More important is that the source 12 generates an aqueous nutrient stream from which nutrients can be collected.

With further reference to FIG. 1, a nutrient stream from the nutrient source 12 can be provided to a reusable nutrient cartridge 14. In some embodiments, the nutrient stream has low suspended solids concentrations, low pathogenic materials, and high nutrient concentrations (specifically nitrogen in the form of urea or ammonia, phosphorous, and/or potassium). The nutrient stream can be flowed through the nutrient cartridge 14, which utilizes a specific blend of ion exchange, biological, and/or adsorptive materials to selectively capture nutrients from the nutrient stream. In some embodiments, the cartridge is placed in-line of the flowing stream to facilitate the removal of the nutrient materials in a process that resembles the operation of an inline filter. As the nutrient stream is flowed through the cartridge 14, the cartridge adsorbs the nutrients so as to become "charged" with the nutrients. Once the cartridge 14 reaches its nutrient capture capacity, it is deemed to be fully charged and is prepared for use as a source of fertilizer.

At that point, the reusable nutrient cartridge 14 can be delivered to an end use site 18 at which it will be "discharged." Such discharging comprises flowing water through the cartridge 14 to release the nutrients contained in the cartridge and produce a dilute nutrient solution that can be used to simultaneously irrigate and fertilize, or fertigate, crops or other plants. This process is illustrated in FIG. 1 with a further reusable nutrient cartridge 16 located at the end use site 18. In some embodiments, the water comprises clean water containing no additives. In other embodiments, the water can comprise compounds that assist in the release of nutrients from the cartridge 16 and/or compounds, such as specific nutrients, that the end user wishes to provide to the crops or other plants. In still other embodiments, additional physical, chemical, or biological processes can be performed at the end use site 18 to induce the discharge of the nutrients. Such processes can comprise one or more of manipulation of concentration gradients, biological regeneration, precipitation and dissolution, ion exchange, electrochemical oxidation, thermal stimulation, and ultrasonic irradiation. Regardless, discharging entails creating conditions to reverse the fugacity gradient to release the bound nutrient materials into the aqueous stream or to oxidize them completely so as to achieve removal, thus regenerating the capacity to be charged again. During ideal discharge scenarios, nutrients release into the flow-through stream for fertegation of any properly sized agricultural or horticultural operation.

Completing the discharge phase readies the reusable nutrient cartridge 16 for a new charging phase. Accordingly, once the cartridge 16 has been fully discharged at the end use site 18, it is ready for another charge cycle and can be returned to the nutrient source 12 for this purpose. The above-described cycle can be repeatedly performed throughout the useful life of the cartridge 14, 16.

The nutrient source 12 and the end use site 18 may be remote of each other. For this reason, the reusable nutrient cartridges 14, 16 can be relatively small to enable them to be easily delivered between the nutrient source 12 and the end use site 18. By way of example, the cartridges 14, 16 can have a volumetric capacity of approximately 1 to 5 L. In such cases, a variety of distribution methods are possible, including delivery by land vehicle as well as by unmanned aerial vehicles (UAVs). It is noted, however, that the nutrient source 12 and the end use site 18 may be located close to each other, and even at the same site. For example, the nutrient source 12 could be located at one's home and the end use site could be a yard or greenhouse of the home. In such cases, the cartridge 14, 16 can be a fixed installation, in which case delivery is unnecessary. In that scenario, the cartridge 14, 16 could be submerged in a reservoir where the nutrients accumulate (e.g., septic tank, fish pond, aquaculture tank, or storm water retention pond), thus providing a nutrient sink.

Figure 2A:
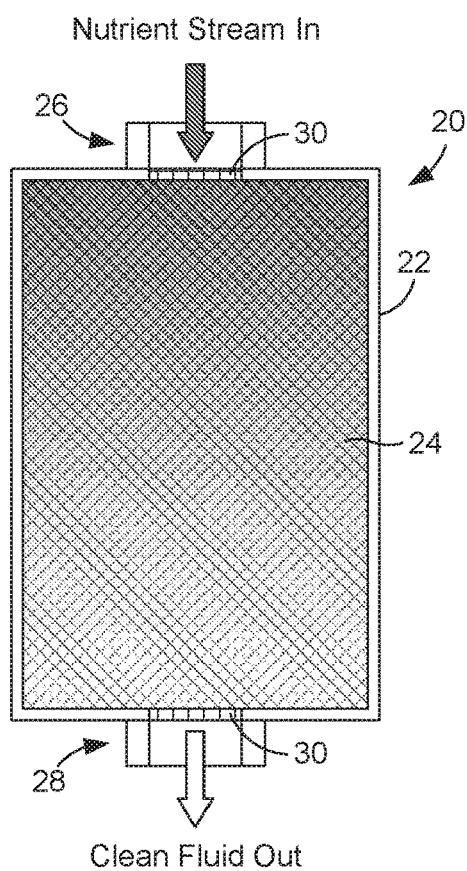
FIG. 2A is a side view of an embodiment of a nutrient cartridge that can be used in the system of FIG. 1, the cartridge being shown during a nutrient charging process.
Figure 2B:
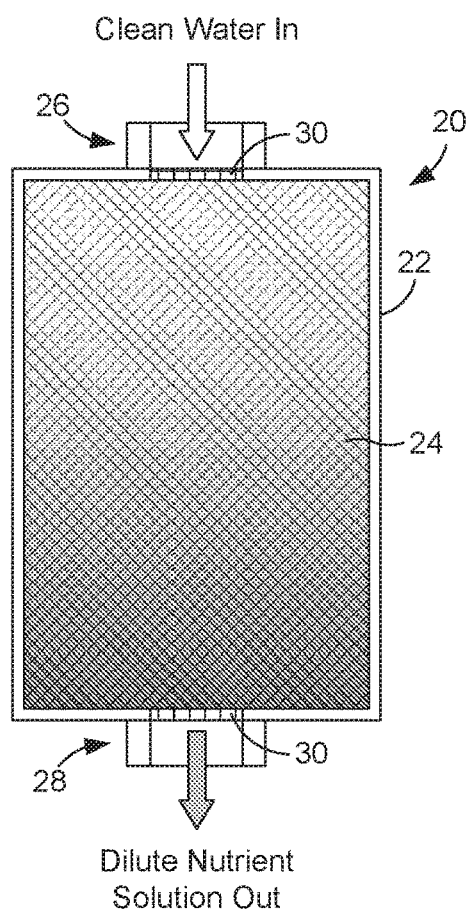
FIG. 2B is a side view of the nutrient cartridge of FIG. 2, the cartridge being shown during a nutrient discharging process.

FIGS. 2A and 2B show an example reusable nutrient cartridge 20. The cartridge 20 is illustrated in FIG. 2A during the charging phase, while the cartridge is illustrated in FIG. 2B during the discharging phase. As shown in the figures, the cartridge 20 includes an outer housing 22 that contains nutrient adsorption material 24 that is configured to capture nutrients contained within the nutrient stream. In some embodiments, the nutrient adsorption material 24 comprises zeolitic materials (zeolites) in either granular or solidified powder form. In some embodiments the nutrient adsorption material 24 can comprise other materials that assist in the removal of dissolved organic compounds from the nutrient stream. For example, the nutrient adsorption material 24 can also include pyrolyzed forms of carbon, such as biochar, charcoal, and/or granular activated carbon to remove compounds that contribute to color and odor. Various other mineral rocks, such as calcium and magnesium carbonates and volcanic rock, can also be used as adsorbents, bio carriers, and struvite precipitation sites. Ordinary Portland cement (OPC) can be utilized as a binding material to form a composite material for simultaneous removal of various materials. The ideal mixture is one that is capable of removing high quantities of pertinent nutrient materials from the influent nutrient stream. Pathogen removal can also be achieved by the utilization of microfiltration technology, which can passively degrade unwanted bacteria and pathogenic materials. The characteristics of the nutrient adsorption material 24, such as material composition, ratio of material mixtures, particle size, porosity, permeability, hydrophilicity, and hydrophobicity, can influence the performance of the cartridge 20 and the effectiveness of the intended objective of recovering nutrients.

As shown in FIG. 2A, the reusable nutrient cartridge 20 is charged by flowing the nutrient stream through an inlet 26 at one end of the cartridge, through the nutrient adsorption material 24, and out through an outlet 28 at the opposite end of the cartridge. As is further shown in FIG. 2A, mesh 30 can be provided at one or both of the inlet 26 and outlet 28 to retain the nutrient adsorption material 24 within the housing 22. As the nutrient stream is flowed through the nutrient adsorption material 24, the material collects nutrients, as indicated by the shading in the figure. At least initially, clean water (i.e., water stripped of its nutrients) flows out from the outlet 28. Notably, the nutrient stream can flow through the nutrient adsorption material 24 via capillary movement. This capability accommodates operation of the cartridge in microgravity environments making the device a suitable technology for space exploration and Mars colonization missions. The capillary movement can be enhanced, if desired, by utilizing hydrophilic media within the nutrient adsorption material 24. In other embodiments, hydrophobic materials can be utilized to enhance the performance of the reusable nutrient cartridge 20. For example, hydrophobic media can be used to create better contact between the nutrient stream and sorbents in the nutrient adsorption material 24. Hydrophobic or hydrophilic surfaces may either be made available through native material properties (such as polytetrafluoroethylene (PTFE)) or through surface modification through the use of femto lasers.

With reference to FIG. 2B, a charged reusable nutrient cartridge 20 can be discharged by flowing clean water through the cartridge so as to produce a dilute nutrient solution that exits the cartridge via the outlet 28. As noted above, however, the water flowed through the cartridge 20 can comprise additives that either assist with the uptake of nutrients or provide some benefit to the crops or other plants receiving the solution.

Figure 3:
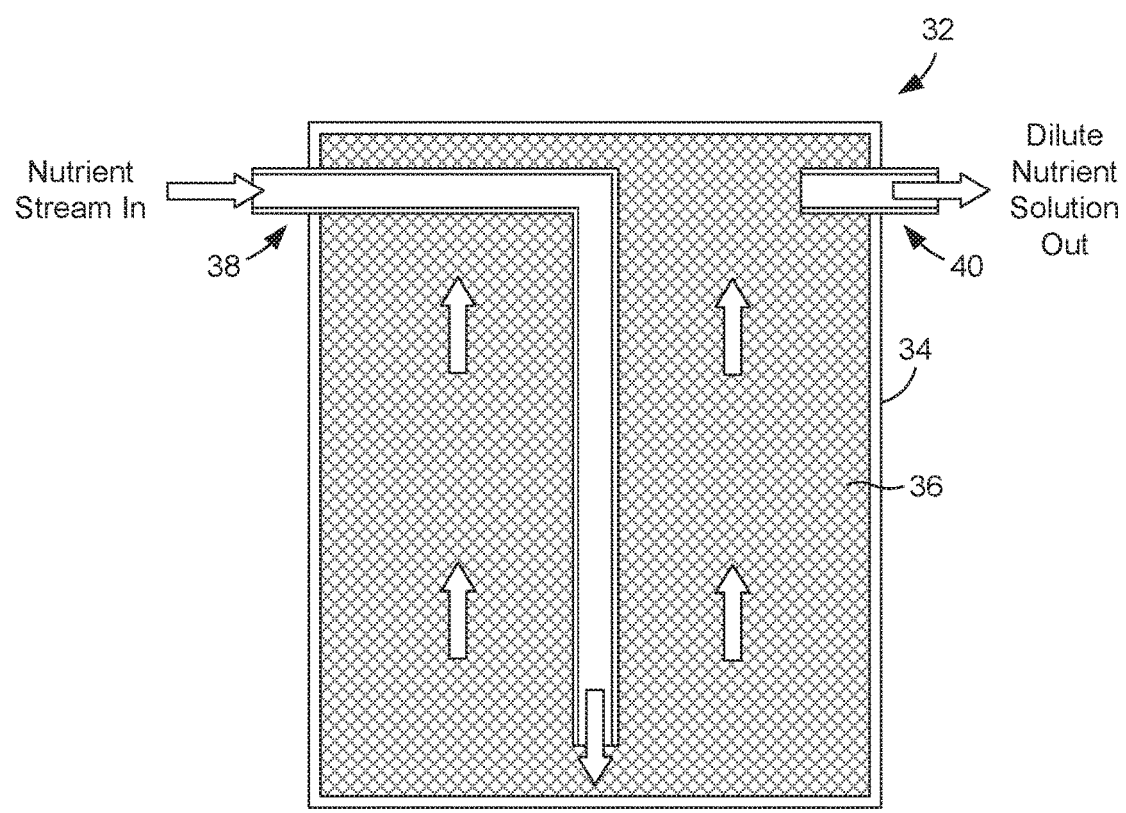
FIG. 3 is a side view of an alternative embodiment of a nutrient cartridge that can be used in the system of FIG. 1, the cartridge being configured for vertical upflow.

FIG. 3 illustrates an alternative configuration for a reusable nutrient cartridge 32. Like the cartridge 20, the cartridge 32 includes an outer housing 34 that contains nutrient adsorption material 36. In addition, the housing 34 includes an inlet 38 for receiving a nutrient stream and an outlet 40 from which a dilute nutrient solution can flow. In this configuration, however, the inlet 38 and outlet 40 are both located at the same end (i.e., top end) of the housing 34 and the nutrient stream is released at the bottom of the cartridge 32 using a conduit 41 such that the stream flows upward through the cartridge before exiting the cartridge.

Figure 4:
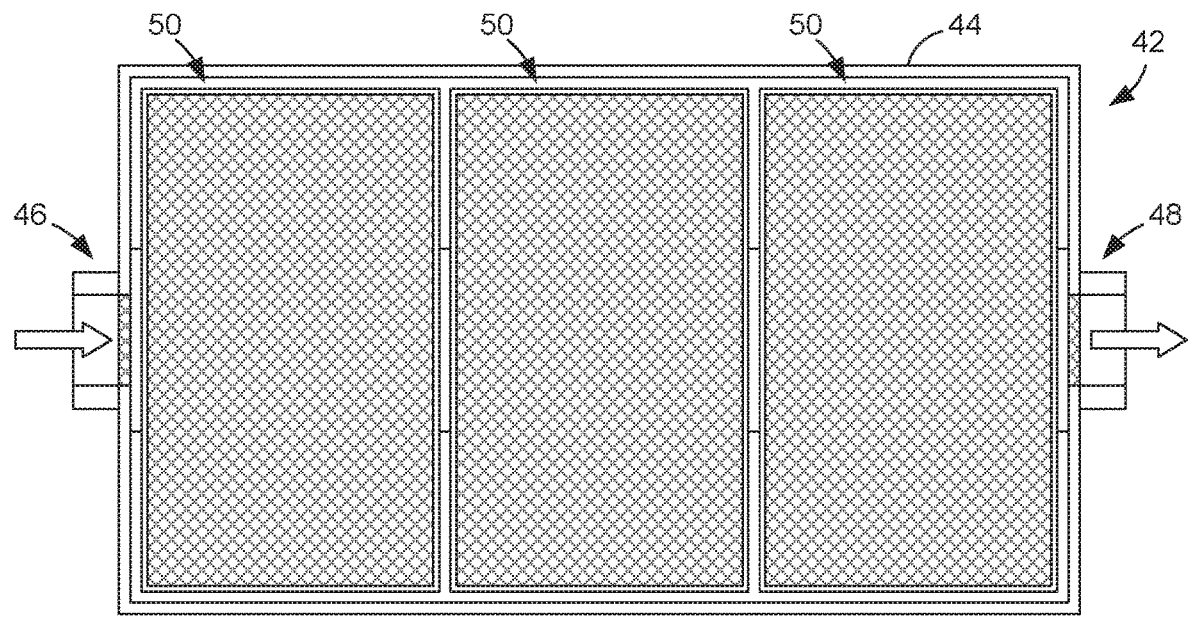
FIG. 4 is a side view of a further alternative embodiment of a nutrient cartridge that can be used in the system of FIG. 1, the cartridge comprising multiple individually removable modules that can have alternative configurations.

FIG. 4 illustrates a further alternative configuration for a reusable nutrient cartridge 42. This cartridge 42 also includes an outer housing 44 having an inlet 46 and an outlet 48. In this configuration, however, the cartridge 42 comprises multiple individually removable/replaceable modules 50 each contain material through which the nutrient stream flows. In some embodiments, each module 50 comprises different materials that are either specifically configured to remove a particular material (e.g., nutrient) from a nutrient stream during charging or add a particular compound (e.g., nutrient) to the nutrient solution during discharging. This configuration enables specialization of the cartridge for optimal performance based on location and application. As an example, one or more of the modules 50 can be configured to uptake nutrients while one or more other modules 50 can be configured to "polish" the stream by removing color, turbidity, and/or pathogens.

Figure 5:
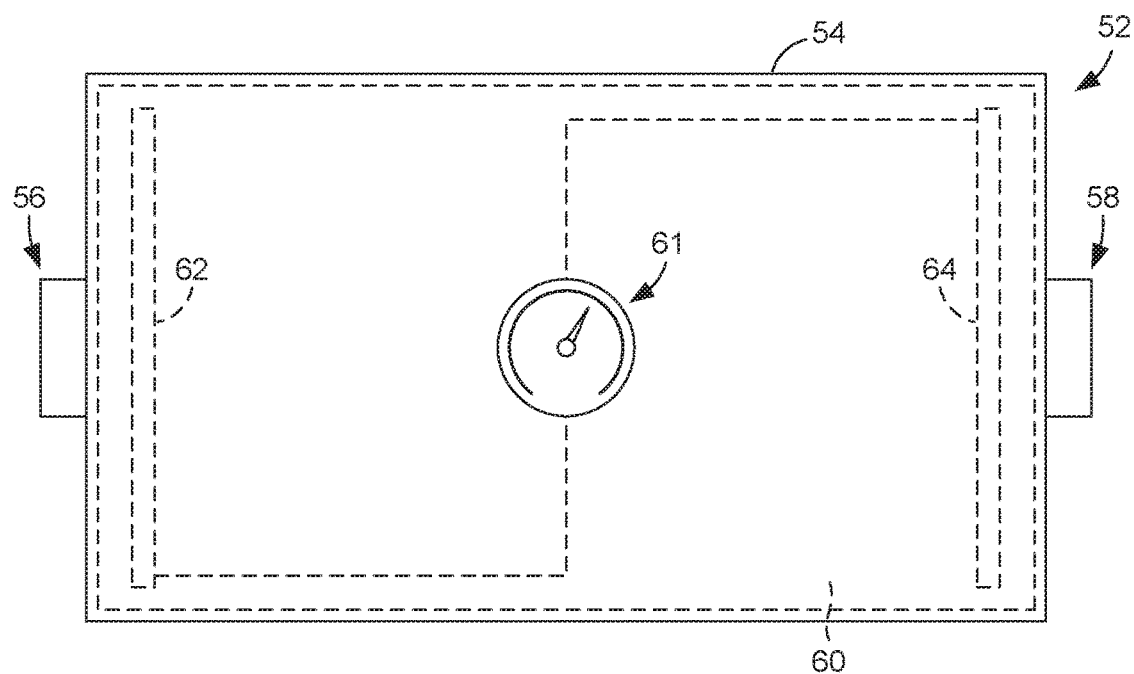
FIG. 5 is a side view of an embodiment of a nutrient cartridge that can be used in the system of FIG. 1, the cartridge including an indicator that indicates a level of charge within the cartridge.

In some embodiments, the reusable nutrient cartridge can include a charge indicator that provides an indication of the level of nutrient concentration within the cartridge. FIG. 5 shows an example of this. As illustrated in this figure, a cartridge 52 includes a housing 54 having an inlet 56 and an outlet 58. Contained within the housing 54 is nutrient-adsorbing material 60. Mounted to the exterior of the housing 54 is an indicator 61, in the form of a gauge, which identifies the level of charge within the container 52. In the example of FIG. 5, the level of charge is determined by measuring the potential difference between an anode 62 provided at one end of the cartridge 52 and a cathode 64 provided at the other end of the cartridge. In such an embodiment, the potential difference can be correlated to a concentration of nutrient ions within the cartridge 52. Notably, both the indicator 61 and the charge quantification method can take different forms. For example, the indicator 61 can be configured as a liquid crystal status bar or battery similar to that used in mobile phones, or a series of light emitting diodes (LEDs) similar to those used on laptop batteries. The technology used to measure the level of charge can alternatively operate based upon total dissolved solids, ammonium concentration, pH, electric potential, or other suitable measure.

Figure 6:
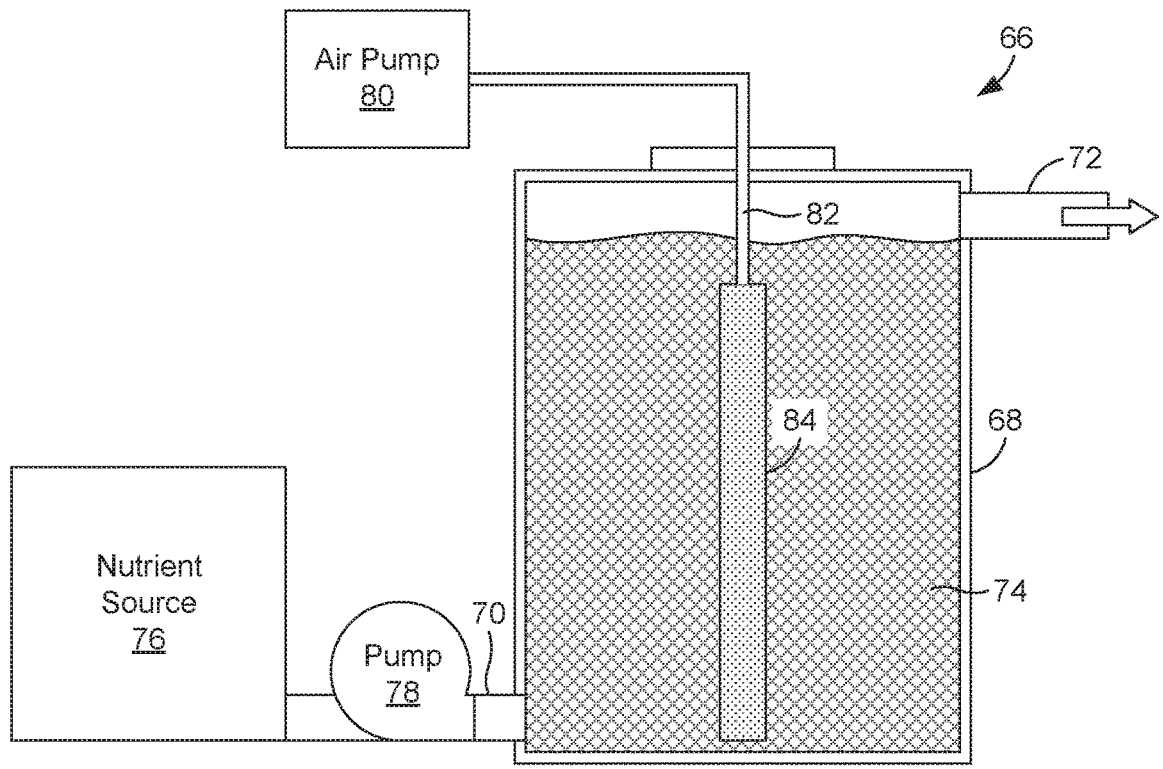
FIG. 6 is a side view of an embodiment of a nutrient cartridge that incorporates aeration.

FIG. 6 illustrates a further example nutrient cartridge 66. As before, the cartridge 66 includes a housing 68 having an inlet 70 and an outlet 72, and contains nutrient-adsorbing material 74. A nutrient stream can be fed to the inlet 70 from a nutrient source 76 using a pump 78. In this case, aeration is used to assist with nitrification. In particular, air is pumped into the cartridge 66 using an air pump 80. The air flows from the pump 80 through a conduit 82 to a membrane diffuser 84 that extends along the interior of the housing 68 from the bottom to the top of the nutrient-adsorbing material 74. The flow of air through the nutrient-adsorbing material 74 provides both oxygen and turbulence that can facilitate nutrient capture and release processes. Such a configuration may be particularly useful in situations in which the nutrient source 76 is collocated with the end user site.

The invention claimed is:
1. A reusable nutrient cartridge comprising:
an outer housing having an inlet and an outlet; and
nutrient-adsorbing material contained within the housing, the material including a zeolitic material and being configured to adsorb nutrients;
wherein the cartridge is configured to be charged with nutrients by flowing wastewater through the inlet, through the nutrient-adsorbing material, and through the outlet to enable the nutrient-adsorbing material to adsorb the nutrients from the wastewater, wherein the cartridge is also configured to be later discharged of the adsorbed nutrients by flowing water through the inlet, through the nutrient-adsorbing material, and through the outlet to transfer the nutrients to the water to generate a dilute nutrient solution suitable for use as a fertilizer.

2. The cartridge of claim 1, wherein the housing has volumetric capacity of approximately 1 to 5 liters.

3. The cartridge of claim 1, wherein the nutrient-adsorbing material is configured to adsorb nitrogen, phosphorus, potassium, calcium, and magnesium.

4. The cartridge of claim 1, wherein the nutrient-adsorbing material further comprises a material configured to remove organic compounds from the wastewater.

5. The cartridge of claim 4, wherein the material configured to remove organic compounds comprises carbon, charcoal, or both.

6. The cartridge of claim 4, wherein the nutrient-adsorbing material further comprises mineral rock.

7. The cartridge of claim 1, further comprising a mesh at the inlet, outlet, or both that is configured to retain the nutrient-adsorbing material within the outer housing.

8. The cartridge of claim 1, wherein the nutrient-adsorbing material is contained within a removable and replaceable module contained within the outer housing.

9. The cartridge of claim 1, wherein the housing contains multiple individually removable and replaceable modules that each contain different materials.

10. The cartridge of claim 1, further comprising means for measuring a level of nutrient charge of the cartridge and an indicator configured to provide an indication of the level of nutrient charge to a user.

11. The cartridge of claim 10, wherein the level of nutrient charge is proportional to the concentration of nutrients within the cartridge.

12. The cartridge of claim 1, further comprising means for aerating the wastewater within the cartridge.

13. A system for recovering and providing nutrients, the system comprising:
 a plurality of reusable nutrient cartridges, each cartridge comprising:
 an outer housing having an inlet and an outlet, and
 nutrient-adsorbing material contained within the housing, the material including zeolitic material and being configured to adsorb nutrients,
 wherein the cartridge is configured to be charged with nutrients by flowing wastewater through the inlet, through the nutrient-adsorbing material, and through the outlet to enable the nutrient-adsorbing material to adsorb the nutrients from the wastewater, wherein the cartridge is also configured to be discharged of the adsorbed nutrients by flowing water through the inlet, through the nutrient-adsorbing material, and through the outlet to transfer the adsorbed nutrients to the water to generate a dilute nutrient solution suitable for use as a fertilizer.

14. A method for recovering nutrients from wastewater and facilitating use of the nutrients as fertilizer, the method comprising:
 charging a reusable nutrient cartridge with nutrients by flowing wastewater through the cartridge and adsorbing the nutrients from the wastewater with a nutrient-adsorbing material contained within the cartridge, the nutrient-adsorbing material including a zeolitic material;
 later discharging the reusable nutrient cartridge by flowing water through cartridge to transfer the adsorbed nutrients from the nutrient-adsorbing material to the water to generate a dilute nutrient solution suitable for use as a fertilizer; and
 later still recharging the reusable nutrient cartridge with nutrients by again flowing wastewater through the cartridge and adsorbing the nutrients from the wastewater with the nutrient-adsorbing material contained within the cartridge so that the cartridge can again be used to provide generate a dilute nutrient solution.

15. The method of claim 14, further comprising delivering the charged reusable nutrient cartridge to an end use site prior to discharging.

16. The method of claim 14, wherein the housing has volumetric capacity of approximately 1 to 5 liters.

17. The method of claim 14, wherein the nutrient-adsorbing material is configured to adsorb nitrogen and phosphorus.

18. The method of claim 14, wherein the nutrient-adsorbing material further comprises a material configured to remove organic compounds from the wastewater.

19. The cartridge of claim 1, wherein the wastewater comprises one or more of water from a wastewater treatment facility, a septic system, a sewer line, a urinal, a source of food waste, a fish pond, and an aquaculture tank.

20. The system of claim 13, wherein the wastewater comprises one or more of water from a wastewater treatment facility, a septic system, a sewer line, a urinal, a source of food waste, a fish pond, and an aquaculture tank.

21. The method of claim 14, wherein the wastewater comprises one or more of water from a wastewater treatment facility, a septic system, a sewer line, a urinal, a source of food waste, a fish pond, and an aquaculture tank.

* * * * *